March 3, 1970     N. STROTMAN     3,498,463
FILTER ASSEMBLY
Filed April 22, 1968     2 Sheets-Sheet 1
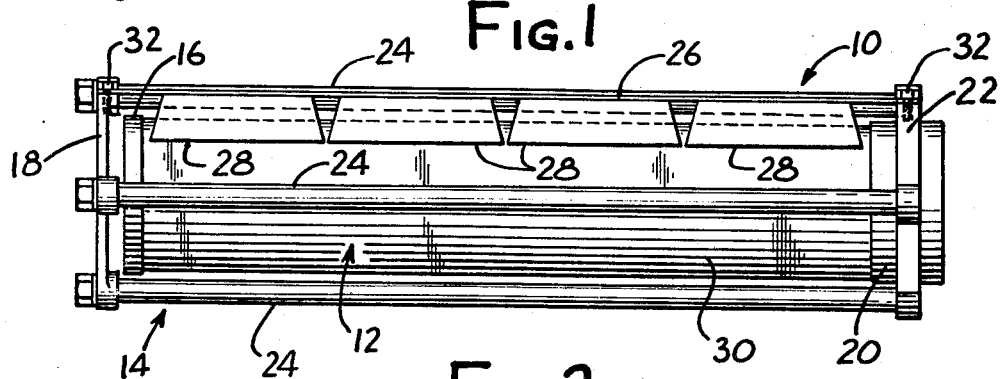
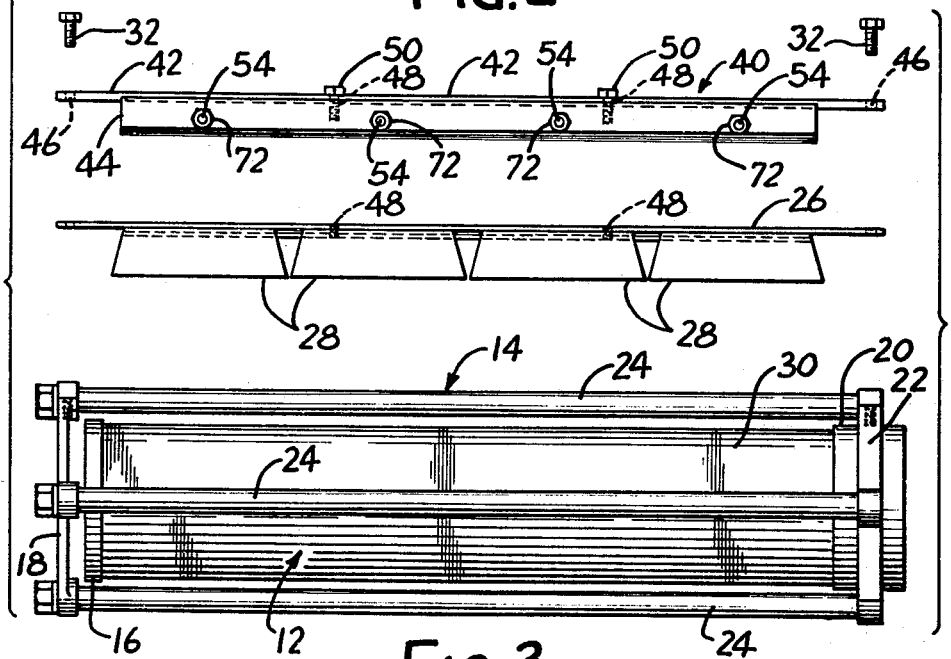
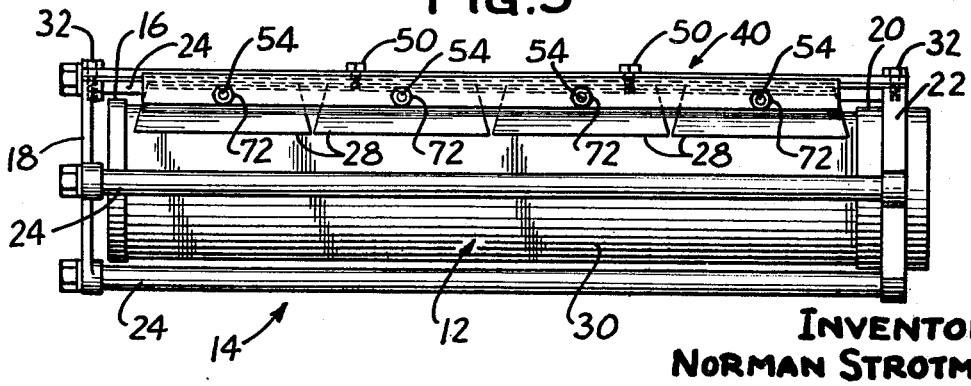
INVENTOR
NORMAN STROTMAN
by: Wallenstein, Spangenberg, Hattis & Strampel
ATTYS.

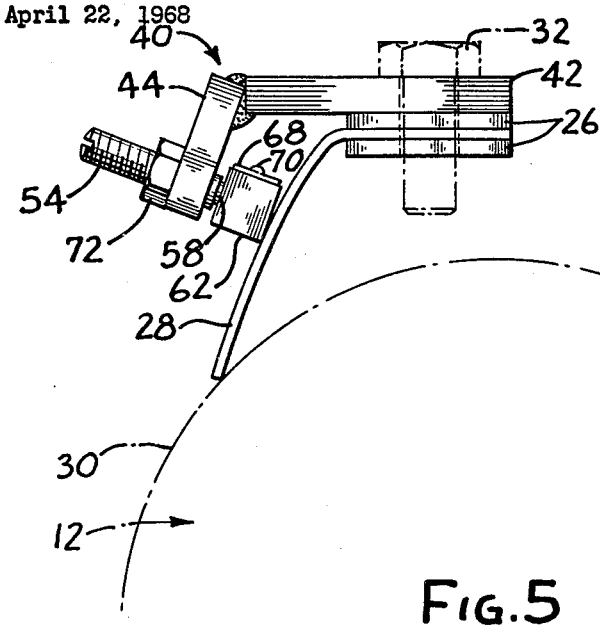
FIG.4
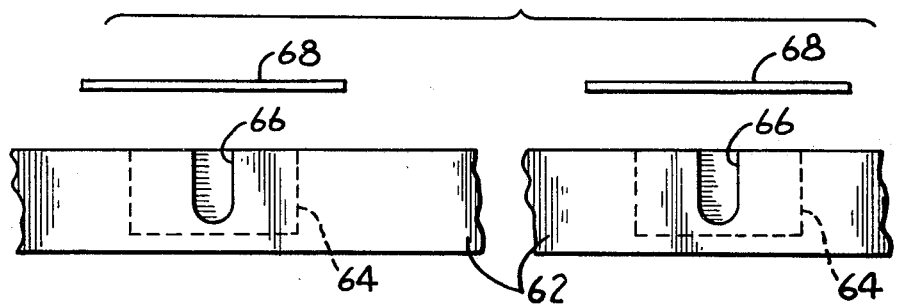
FIG.5
FIG.6
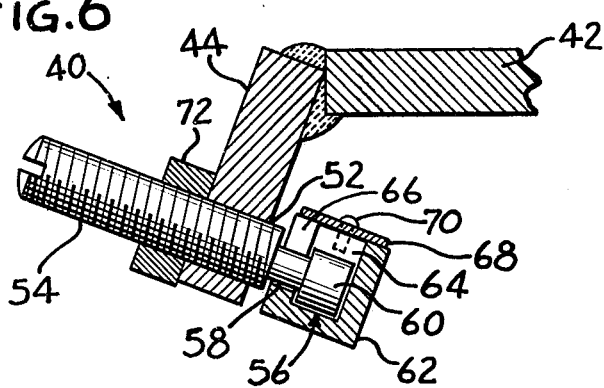
INVENTOR
NORMAN STROTMAN
by: Wallenstein, Spangenberg, Hattis &
Strampel
ATTYS.

United States Patent Office 3,498,463
Patented Mar. 3, 1970

3,498,463
FILTER ASSEMBLY
Norman Strotman, Custer City, Pa., assignor to Witco Chemical Company, Inc., New York, N.Y., a corporation of Delaware
Filed Apr. 22, 1968, Ser. No. 723,082
Int. Cl. B01d *35/16*
U.S. Cl. 210—396            12 Claims

ABSTRACT OF THE DISCLOSURE

A filter assembly of the type wherein the filter element desirably comprises a rotatable, hollow metal member, particularly a tight coil of metal ribbon, or wire, in cylindrical form, having a plurality of openings therein for selectively permitting the passage of material therethrough. The assembly includes a scraper blade which desirably is stationary or fixed for removing solid matter from the surface of the filter element as it rotates. The assembly further includes a pressure applying unit which is positioned on the filter assembly adjacent to the scraper blade. The pressure applying unit has an adjustable bar for engaging the scraper blade which enables the scraper blade to be selectively moved toward the surface of the filter element in accordance with the degree of contact and pressure between the blade and the surface of the filter element required to remove solid matter from the surface of the filter element thereby to permit substantially continuous flow of material through the openings of the filter element during operation.

---

Industrial filtration operations commonly are carried out with heavy duty surface-type filters wherein the filter element comprises a hollow metal member in cylindrical form and having a plurality of openings therein for selectively permitting the passage of material therethrough. A metal scraper blade is generally associated with the filter element for removing solid matter from the surface thereof to enable material to continue to pass through the openings in the filter element. The filter element in such filters may be stationary or rotatable. In those instances where a stationary element is used, a movable scraper blade is utilized to remove solid matter from the surface of the filter element. On the other hand, if a rotatable element is used, the scraper blade is fixed in relation to the surface of the element in a manner to enable it to continuously remove solid matter from the surface thereof. Exemplary of heavy duty filters of the type here under consideration are those sold under the trademark "Purolator" (Purolator Products, Inc.).

In the normal operation of such filters as the aforementioned "Purolator" edge wound wire filters, they plug rather rapidly despite the scraping action of the blades, particularly under heavy duty industrial filtration operations. As a result, the unremoved contaminating material causes a pressure drop to develop across the filter element or elements. To relieve this condition, the contaminating material has to be removed by backwashing, pressure venting, or other techniques. Not uncommonly, even by careful adjustment of the scraper blades and preconditioning of the filter surface, a man is required to devote substantial time to monitor the pressure condition of the filter to assure proper functioning of the filter and to reduce the "down time" involved in freeing the filter from solid contaminants. Such operations, obviously, entail serious economic as well as other disadvantages.

In accordance with the present invention an improved filter assembly is provided which substantially eliminates the aforementioned problems heretofore encountered in industrial filtration operations of the type here under consideration. Continuous or substantial monitoring of the filters by plant personnel is obviated. The undesirable pressure conditions previously experienced in such operations are essentially overcome. "Down time" is reduced to cleaning of the filter element to remove normal solids build-up and to inspection of the element for wear. What is more, these results are achieved at nominal cost and without the need for changing presently employed filtration setups.

In brief, the objectives of the present invention are attained with a filter assembly which includes a filter of the type wherein the filter element comprises a metal member in cylindrical form having a plurality of openings therein for selectively permitting the passage of material therethrough. The metal member may be fabricated of porous or perforated metal, wire cloth, or a tight coil of metal ribbon. The assembly further includes a scraper blade, or a plurality of such blades, positioned in relation to the metal member of the filter element to enable the blade, or blades, to make edge contact with the outer surface thereof. Adjacent the scraper blade, or blades, there is provided a pressure-applying unit having adjustable means thereon including a scraper blade-engaging member. The pressure applying unit enables the edge of the scraper blade, or blades, to be selectively forced against the surface of the metal member of the filter element in accordance with the degree of contact and pressure required to remove solid matter from the surface of the metal member thereby to permit substantially continuous flow of material through the openings of the filter element during operation of the assembly.

Other advantages and features of the invention will become more particularly apparent upon making reference to the specification to follow, the claims and the drawings wherein:

FIG. 1 is a front view in elevation of a portion of an embodiment of a filter assembly of the present invention showing the filter element and associated scraper blades;

FIG. 2 is an exploded view of an embodiment of the filter assembly of the present invention showing the filter element, the scraper blades, and the pressure-applying unit of the assembly;

FIG. 3 is a front view in elevation showing the embodiment illustrated in FIG. 2 in its assembled condition;

FIG. 4 is an enlarged fragmentary side view in elevation showing the position of the pressure-applying unit in relation to the scraper blades of the embodiment of the assembly illustrated in FIG. 2;

FIG. 5 is an enlarged fragmentary exploded view of the scraper blade-engaging member of the pressure applying unit showing the slots formed therein and the cover plates for the slots; and, FIG. 6 is an enlarged fragmentary vertical sectional view of the pressure-applying unit of said embodiment of the filter assembly.

Referring, now, in greater detail to the drawings, in FIG. 1 there is illustrated a filter 10 comprising a filter element 12 rotatably supported in a frame 14. The element 12 desirably is in the form of a hollow cylinder fabricated of porous or perforated metal or wire cloth, but, particularly, a tight edge wound coil of stainless steel ribbon. The element 12 has an end cap 16 at one end which is journaled in an end plate 18 of the frame 14. At its other end, the element 12 is provided with an external bushing 20 which is engaged by a collar 22 of the frame 14. A plurality of elongated rods 24 connect the end plate 18 with the collar 22 of the frame 14. Secured to the frame 14 are two metal plates 26—26 which carry a plurality of outwardly curved, metal scrapper blades 28 adapted to make edge contact with the outer surface 30 of the filter element 12. The plates 26—26 together with the scraper blades 28, are held in fixed position on the frame 14 by a pair of bolts 32—32. The filter 10, which comprises filter element 12, the frame 14 and the scraper blades 28 are of conventional construction and may vary in accordance with manufacturers' specifications. It is to be understood, therefore, that the description of the invention with reference thereto is by way of illustration and not limitation.

Referring now to FIGS. 2-6 of the drawing, the objectives of the present invention are most advantageously achieved with a pressure-applying unit 40. The unit 40, as illustrated, has a body portion comprising an upper, relatively wide, flat, elongated plate 42 and a downwardly and outwardly extending relatively narrow, flat elongated plate 44. The body portion of the unit 40 is advantageously fabricated of heavy gauge steel and may be of unitary construction or, as illustrated, may consist of two separate pieces of plate stock which have been butt welded together at angle angle to one another. The plate 42 is adapted to be secured in superimposed relation on the plates 26—26 which carry the scraper blades 28. To this end, bores 46—46 are provided at the ends of the plate 42 for receiving the bolts 32—32. Additional bores 48—48, for bolts 50—50, desirably are provided in the plate 42 and the plates 26—26 to enable the unit 40 to be more securely fastened on the plates 26—26.

The plate 44, adjacent its free longitudinal margin, is provided with a plurality of spaced, tapped bores 52 each of which receives an externally threaded screw 54. The outer end of each of the screws 54 is slotted to facilitate adjustment thereof. The inner end of each of the screws 54 is joined to a pressure bar-engaging extension 56 comprising a neck portion 58 and a head portion 60. The portions 58 and 60 of the extension 56 of the screws 54 are adapted to engage an elongated, rectangularly shaped pressure bar 62. To this end, spaced, longitudinally extending slots 64 are provided in the bar 62 for receiving the head portion 60 of the screws 54. The slots 64 communicate with relatively narrow slots 66, formed in the side wall of the bar 62, for receiving the neck portion 58 of each of the extensions 56. Cover plates 68 are provided for each of the slots 64. The plates 68 may be secured on the bar 62 in any convenient manner. In the embodiment illustrated, drive rivets 70 are used for this purpose. A lock nut 72 is provided for each of the screws 54 to prevent movement thereof after a selected adjustment has been made.

The filter assembly of the present invention can be used in any industrial operation where heavy duty surface filtration techniques are involved. In operation, the screws 54 can be selectively adjusted to cause the pressure bar 62 to force the scraper blades 28 against the surface 30 of the element 12 to the extent rquired effectively to remove solid matter from the surface 30. Generally speaking, in any given operation, only one such adjustment is needed and this is performed at the time of installement. With normal wear of the filter element surface and the scraper blades, further adjustment, of course, may be required. The position of the pressure bar 62 is such that maximum utility is made of the curvature impressed upon the blades and the inherent spring tension thereof. As clearly seen in FIG. 4 of the drawing, the pressure bar 62 engages the blades 28 at approximately the area of greatest curvature of the blades to achieve this end.

What is claimed is:

1. In a filter assembly of the type wherein the filter element comprises a member in cylindrical form having a plurality of openings therein for selectively permitting the passage of material therethrough, said filter assembly including at least one deformable, resilient scraper blade having a working edge in contact with the surface of the filter element for exerting a resilient force on said surface whereby solid matter can be removed therefrom, the improvement comprising pressure-applying means for said filter assembly having a body portion mounted in spaced relation with respect to said at least one deformable, resilient scraper blade and the surface of said filter element, said body portion having adjustable means thereon including a scraper blade-engaging member, means for mounting said scraper blade-engaging member with respect to said body portion for movement toward or away from the resilient scraper blade in a direction substantially transverse to the area surface of the resilient scraper blade whereby the blade can be deformed and the resilient force exerted on the surface of said filter element by the working edge of the blade can be selectively changed to provide the degree of contact between the working edge of the blade and said surface required to remove solid matter from said surface to permit substantially continuous flow of material through the openings of the filter element.

2. An assembly in accordance with claim 1 wherein the adjustable means of said pressure-applying means comprises screw means which is engaged with said scraper blade-engaging member.

3. An assembly in accordance with claim 1 wherein the scraped blade-engaging member comprises an elongated bar which is slotted to receive a portion at least of said adjustable means.

4. An assembly in accordance with claim 1 wherein the scraper blade is curved outwardly with relation to the filter element and the scraper blade-engaging member engages the blade at approximately the area thereof of greatest outward curvature.

5. An assembly in accordance with claim 1 wherein the adjustable means is provided with a head portion which is in engagement with the scraper blade-engaging member.

6. An assembly in accordance with claim 5 wherein retaining means are provided for the scraper blade-engaging member for maintaining the head portion of the adjustable means in engagement with the scraper blade-engaging member.

7. An assembly in accordance with claim 2 wherein locking means is provided for the screw means to maintain the scraper blade-engaging member in a fixed selected position with relation to the scraper blade.

8. An assembly in accordance with claim 1 wherein the filter element is rotatable, and the scraper blade and pressure-applying means are stationary.

9. An assembly in accordance with claim 1 wherein the filter element is of the metal-edge type and comprises a tight coil of metal ribbon in the form of a cylinder.

10. An assembly in accordance with claim 1 wherein a plurality of scraper blades are provided which are arranged in side-by-side relation with respect to the filter element, and said adjustable means includes a plurality of screws positioned in opposed relation to the scraper blades.

11. In a filter assembly of the type wherein the filter element comprises a hollow, rotatable metal member in cylindrical form having a plurality of openings therein for selectively permitting the passage of material therethrough, said filter assembly including a plurality of stationary, outwardly curved scraper blades arranged in side-by-side relation across the outer surface of said metal member, the improvement comprising pressure-applying means having a body portion rigidly mounted in spaced relation with respect to said scraper blades and the surface of said filter element, said body portion having a plurality of adjustable screws arranged in opposed relation with respect to the scraper blades of the filter assembly, and an elongated, scraper blade-engaging bar for contacting and exerting pressure on the scraper blades, said bar having a plurality of slots formed therein for receiving an end portion of said screws whereby the working edges of the scraper blades can be selectively urged against the outer surface of the cylindrical metal member of the filter element by the bar in accordance with the degree of contact and pressure between the working edges of the blades and said outer surface required to remove solid matter from said surface thereby to permit substantially continuous flow of material through the openings of the metal member.

12. An assembly in accordance with claim 11 wherein retaining means are provided on the scraper blade-engaging bar for maintaining said end portion of the screws in the slots formed in the bar.

References Cited

UNITED STATES PATENTS

| 1,415,859 | 5/1922 | Bates | 210—396 X |
| 1,856,452 | 5/1932 | Armstrong | 210—396 X |
| 2,054,273 | 9/1936 | Subkow | 210—396 X |

JAMES L. DECESARE, Primary Examiner

U.S. Cl. X.R.

210—402